(12) United States Patent
Hino et al.

(10) Patent No.: US 8,946,971 B2
(45) Date of Patent: Feb. 3, 2015

(54) ACTUATOR

(75) Inventors: Tetsuo Hino, Yamato (JP); Jun Yamamoto, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 536 days.

(21) Appl. No.: 13/312,619

(22) Filed: Dec. 6, 2011

(65) Prior Publication Data
US 2012/0161574 A1    Jun. 28, 2012

(30) Foreign Application Priority Data
Dec. 22, 2010 (JP) .................................. 2010-285743

(51) Int. Cl.
*F03G 7/00* (2006.01)

(52) U.S. Cl.
CPC ...................................... *F03G 7/005* (2013.01)
USPC .......................................... 310/300; 310/364

(58) Field of Classification Search
USPC ......................................... 310/300, 363–366
See application file for complete search history.

(56) References Cited

U.S. PATENT DOCUMENTS

2002/0177039 A1* 11/2002 Lu et al. ..................... 429/213
2012/0228999 A1* 9/2012 Yamamoto et al. ........... 310/330

FOREIGN PATENT DOCUMENTS

JP    2008-228542 A    9/2008
WO   2011/070912 A1   6/2011

* cited by examiner

*Primary Examiner* — Dang Le
(74) *Attorney, Agent, or Firm* — Fitzpatrick, Cella, Harper & Scinto

(57) ABSTRACT

The present invention provides an actuator which uses a cationically conductive polymer electrolyte and shows a large deformation response. The actuator has a pair of opposing electrodes and an intermediate layer arranged between the pair of the electrodes, which actuator being curved and displaced when voltage is applied to the electrodes, wherein the intermediate layer has at least: the cationically conductive polymer electrolyte having an ether bond site and an anion site in its molecule; and a weakly acidic material which interacts with the ether bond site.

7 Claims, 4 Drawing Sheets

20

21

ACTUATOR

BACKGROUND OF THE INVENTION

1. Field of the Invention

The present invention relates to an actuator.

2. Description of the Related Art

In recent years, an actuator made from a material of an organic polymer has been developed.

Japanese Patent Application Laid-Open No. 2008-228542 discloses an ion conductive actuator having a three-layer stacked structure in which an intermediate layer is sandwiched by a pair of electrodes. For the intermediate layer, a polymer ion gel (polymer electrolyte) which has a crosslinking structure prepared by polymerizing: a polymerizable ionic liquid monomer which has a cationic moiety or an anionic moiety of an ionic liquid and a polymerizable unsaturated group; and a crosslinking agent containing two or more polymerizable moieties, is used. Use of such a polymer electrolyte enables a whole solid type actuator, and consequently thus formed actuator can prevent a leakage of a liquid and which shows superior practicality compared to an actuator in which a liquid electrolyte is used for the intermediate layer.

In a polymer electrolyte, however, the mobility (ion conductivity) of the electrolyte inevitably decreases, which prevent the whole solid type actuator using the polymer electrolyte for the intermediate layer from obtaining adequate deformation response characteristics. In fact, in an Example of the Japanese Patent Application Laid-Open No. 2008-228542, an actuator is manufactured by using a polymer electrolyte containing a solvent for promoting ion conduction. Further, such a structure has a limitation in practical applications due to a leakage of the liquid. Although a flexible skeleton (such as an ethylene oxide chain) having an ether skeleton structure which has a low free energy of rotation can be introduced into the polymer electrolyte in order to enhance the ion conductivity, it may lead to a case where mechanical characteristics of the obtained polymer electrolyte become poor. When a cationically conductive polymer electrolyte is further used therein as an electrolyte, oxygen of the ether interacts with the cationic species in the electrolyte and causes reduction in the cationic conduction, which may lead to a case where adequate deformation response characteristics cannot be obtained.

In the Examples of Japanese Patent Application Laid-Open No. 2008-228542, only an anionically conductive polymer electrolyte is used. As such, the actuator using the cationically conductive polymer electrolyte has a problem that the deformation response may not be large enough and the actuator shows poor practicality.

SUMMARY OF THE INVENTION

The present invention has been made in light of such a background art, and an object thereof is to provide an actuator which uses a cationically conductive polymer electrolyte and shows a large deformation response.

The actuator according to the present invention is an actuator having a pair of opposing electrodes and an intermediate layer arranged between the pair of the electrodes, which actuator being curved and displaced when voltage is applied to the electrodes, and in which the intermediate layer has at least: a cationically conductive polymer electrolyte having an ether bond site and an anion site in its molecule; and a weakly acidic material which interacts with the ether bond site.

The present invention can provide an actuator which uses a cationically conductive polymer electrolyte and shows a large deformation response.

Further features of the present invention will become apparent from the following description of Examples with reference to the attached drawings.

BRIEF DESCRIPTION OF THE DRAWINGS

FIG. 2A shows a state in which a cationic species is trapped in the inner part of the cationically conductive polymer electrolyte having the ether bonding chain. FIG. 2B shows a state in which the trap of the cationic species in FIG. 2A is suppressed by the existence of the weakly acidic material that interacts with the ether bond site, in the inner part of the electrolyte in which the weakly acidic material exists.

DESCRIPTION OF THE EMBODIMENTS

Preferred embodiments of the present invention will now be described in detail in accordance with the accompanying drawings.

(Structure of Actuator)

The actuator according to the present invention is an actuator having a pair of opposing electrodes and an intermediate layer arranged between the pair of the electrodes, and which actuator can be curved and displaced by an application of voltage to the electrodes. The intermediate layer at least has: a cationically conductive polymer electrolyte having an ether bond site and an anion site in the molecule; and a weakly acidic material which interacts with the ether bond site.

Figure 1A:
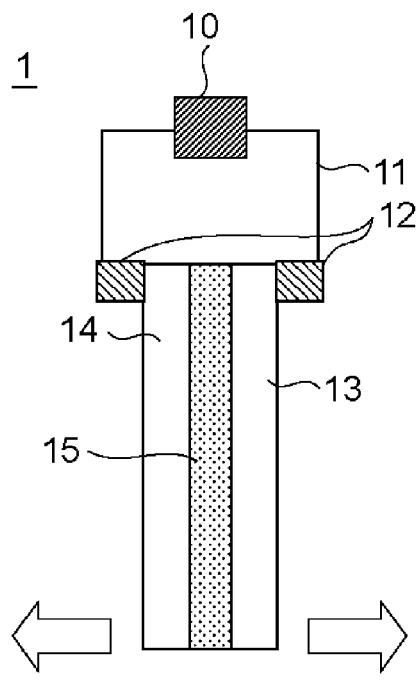
FIG. 1A is a schematic view illustrating one embodiment of an actuator according to the present invention.

The actuator according to the present invention will be described below with reference to FIGS. 1A to 1C. FIG. 1A is a schematic view illustrating one embodiment of an actuator according to the present invention.

The actuator 1 according to the present embodiment has a first electrode 13, a second electrode 14, and an intermediate layer 15 between the first electrode 13 and the second electrode 14. The first electrode and the second electrode are arranged opposite to each other, and the intermediate layer 15 contains a cationically conductive polymer electrolyte having an ether bond site and an anion site in the molecule. When voltage is applied between the first electrode and the second electrode, a cationic species in the electrolyte migrates toward a negative electrode, and thereby the actuator is curved and deformed.

FIG. 1A is a schematic view of the actuator 1 having the structure in which the first electrode 13 and the second electrode 14 that are a pair of opposing electrodes, and the intermediate layer 15 arranged between these electrodes, are stacked, viewed from the direction perpendicular to the stacked direction (horizontal direction of the paper in the present figure) of each electrode and the intermediate layer. Terminals 12 are provided so as to apply the voltage between the electrodes, and are connected to a driving power source 10 by a lead wire 11. The terminals 12 press one end (supporting end) of the actuator 1.

When a voltage is applied to the terminals 12 by the driving power source 10, the voltage is applied between the first electrode 13 and the second electrode 14. Then, since the intermediate layer contains a cationically conductive polymer electrolyte, the cationic species in the cationically conductive polymer electrolyte migrates to the negative electrode due to this voltage application, and the longitudinal end (displacing end) of the actuator is curved and deformed to any one direction of two block arrows in the figure.

Figure 1B:
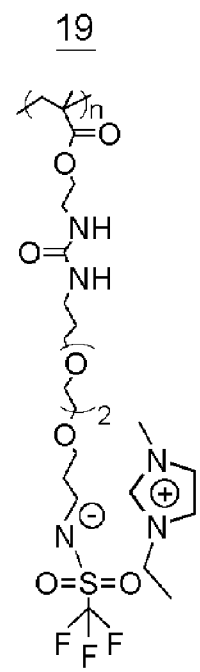
FIG. 1B is a view illustrating one example of a cationically conductive polymer electrolyte (polymer) contained in an intermediate layer according to the present invention.
Figure 1C:
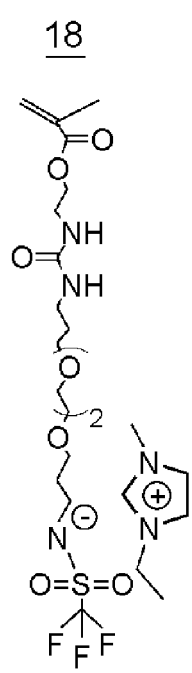
FIG. 1C is a view illustrating one example of a precursor (monomer) of the cationically conductive polymer electrolyte contained in the intermediate layer according to the present invention.

FIG. 1B is a view illustrating one example of a cationically conductive polymer electrolyte (polymer) 19 contained in the intermediate layer according to the present invention, and FIG. 1C is a view illustrating one example of a precursor (monomer) 18 thereof. The cationically conductive polymer electrolyte (polymer) 19 contains a cationic species (imidazolium cation compound in the figure), and is obtained by polymerizing the precursor (monomer) 18.

In the intermediate layer according to the present invention, the cationically conductive polymer electrolyte having an anion site in the molecule has the cationic species, and when voltage is applied to the electrodes, the deformation of the actuator is induced mainly due to the migration of the cationic species. In other words, it is considered that the volume of the electrode to which the cationic species have migrated in the actuator increases, and thus the intermediate layer is curved and deformed to the opposite side.

The cationically conductive polymer electrolyte has an ether bond site in the molecule. An electrolyte polymer is generally hard and brittle, but can provide a polymer electrolyte membrane having adequate flexibility when an ether bond site as a flexible group is contained in the molecule.

In addition, the intermediate layer contains a weakly acidic material which interacts with the ether bond site.

In the cationically conductive polymer electrolyte having the ether bond site as the flexible group in the molecule, an interaction by an electrostatic coordination occurs between a negative charge of an oxygen atom in the ether site and a positive charge of the cationic species in the polymer electrolyte. However, since the intermediate layer has the weakly acidic material which interacts with the ether bond site, the negative charge of the oxygen atom in the ether site interacts with the weakly acidic material, and thereby the interaction by the electrostatic coordination between the oxygen atom in the ether site and the positive charge (cationic species) in the polymer electrolyte is weakened, and as a result, an enhanced migration of the cationic species can be obtained.

Figure 2A:
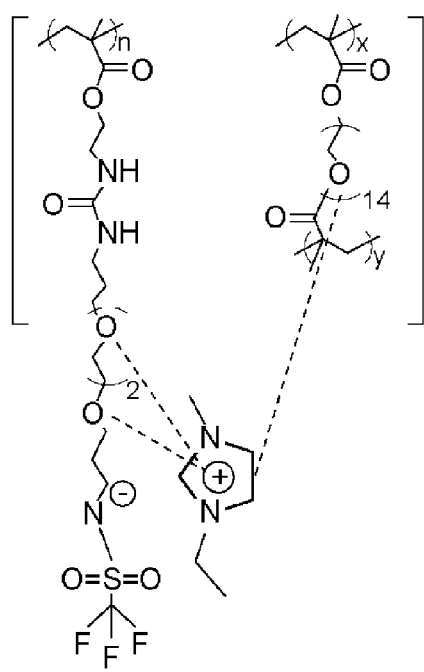
FIGS. 2A and 2B are a view schematically illustrating a state in which a cationically conductive polymer electrolyte having an ether bonding chain interacts with a weakly acidic material, according to the present invention.
Figure 2B:
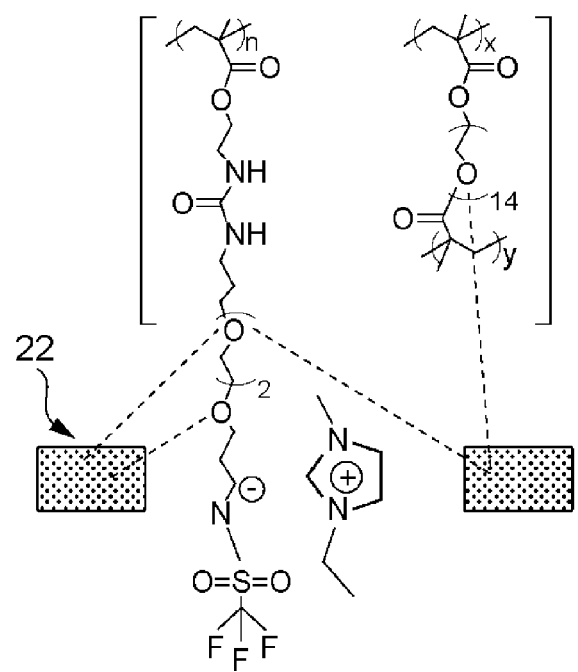

FIGS. 2A and 2B are views schematically illustrating a state in which the cationically conductive polymer electrolyte having the ether bonding chain in the present invention interacts with the weakly acidic material. FIG. 2A is a view illustrating a state in which the cationic species is trapped in the inner part of the cationically conductive polymer electrolyte 20 having the ether bonding chain according to the present invention. FIG. 2B is a view illustrating a state in which the trap of the cationic species is suppressed by the existence of the weakly acidic material 22 that interacts with the ether bond site, in the inner part of the electrolyte 21 in which the weakly acidic material 22 exists. The dotted lines in the figures denote a coordinate bond. The interaction between the ether bond site and the weakly acidic material means an interaction by the coordinate bond.

Incidentally, the compound 20, which is described in FIG. 2A, has ester and urea units in the molecule structure which can also trap the cationic species, but such interactions by the coordinate bond are omitted in FIGS. 2A and 2B.

Since a solid type cationically conductive polymer electrolyte having adequate ionic conductivity can be obtained, as described in the above description, the actuator according to the present invention uses the electrolyte for an intermediate layer. For this reason, in the present invention, when voltage is applied between the first electrode 13 and the second electrode 14, an efficiency with which the cationic species in the electrolyte migrates to a negative electrode is enhanced, and accordingly the actuator can cause a large curvature deformation. As a result, an actuator which shows a large deformation response and which shows superior practicality can be obtained.

The structure of the actuator according to the present invention will be specifically described below.

(Electrode)

The first electrode and the second electrode of the present invention are not particularly limited, and any conventionally known electrode used for an electrode of an actuator (soft actuator) which is made from a material of an organic polymer can be appropriately applied. Specifically, examples of the electrodes include an electrode made from a conductive polymer, an electrode obtained by pressing and solidifying a conductive material such as a CNT, and a flexible electrode in single membrane form which is constituted by at least a conductive material such as a CNT and a polymer.

The electrode may be constituted by a film-shaped membrane which is formed with a cast method or the like and which contains a conductive material, an electrolyte and a polymer.

While the electrode may be, for instance, a thin metal layer formed with plating, sputtering or vapor deposition, flexible electrodes can be desirably used. Such flexible electrodes may be, for instance, a flexible electrode containing an ionic liquid to an extent that does not cause a leakage of the liquid, a gel electrode formed from a carbon nanotube and an ionic liquid, and a flexible electrode further containing a binder polymer in addition to the above. The flexible electrode may also be a membrane formed from a carbon nanotube and various polymer electrolytes, or a membrane formed from a cationically conductive polymer electrolyte containing a weakly acidic material which may be used for the intermediate layer of the present invention; and further, these membranes may contain an ionic liquid to an extent that does not cause a leakage of the liquid.

The shape of the electrode may by a square or an ellipse. When a longitudinal shaped electrode is used, the longer length may be in a direction of between the ends, i.e. the supporting end and the displacing end, to obtain a large amount of displacement when the actuator is curved and deformed. The first and the second electrodes may have the same configuration, or may be structured by different materials or shapes from each other.

The conductive material of the electrode can contain one type of a carbon-based conductive material or a mixture of the materials. Usable carbon-based conductive materials usually include graphite, carbon black, acetylene black, Ketchen black and an activated carbon fiber; and in addition, a nano-carbon material (carbon whisker (vapor-deposited carbon), a (nano) carbon fiber, a carbon nanoparticle, graphene and a carbon nanotube (CNT)); and a conductive polymer as well. Among them, the conductive substance can be a nano-carbon material and particularly can be a CNT, from the viewpoint of its electroconductivity and specific surface area.

The CNT which is one of the nano-carbon materials is constituted by a cylindrically rounded graphite sheet, and has a cylindrical diameter of 1 to 10 nm. The carbon nanotube, as is used for the actuator of to the present invention, is a carbon-based material having a shape in which a graphene sheet is wound into a cylindrical shape, and various nanotubes are known which are roughly classified into a single walled carbon nanotube (SWCNT) and a multi walled carbon nanotube (MWCNT) from the number of layers constituting the circumferential wall. In the actuator according to the present invention, any type of so-called carbon nanotubes like these can be employed.

The carbon nanoparticle which is one of the nano-carbon materials used in the actuator according to the present invention is referred to a particle with a nano-scale ($10^{-6}$ to $10^{-9}$ m) containing carbon as a main component, which includes a carbon nanohorn, amorphous carbon and fullerene, except for the carbon nanotube. The carbon nanohorn indicates a carbon nanoparticle which has a shape in which the graphite sheet has been conically rounded and whose tip is conically closed.

The nano-carbon fiber which is one of the nano-carbon materials to be used for the actuator according to the present invention is formed so that a graphite sheet is cylindrically rounded, and having a cylindrical diameter of 10 to 1,000 nm. It is referred to as a carbon nanofiber as well. The carbon nanofiber is a carbon-based fiber which has a thickness of 75 nm or more, having a hollow structure, and having many branch structures. Commercialized products of the carbon nanofiber include VGCF and VGNF made by Showa Denko K.K.

The graphene which is one of the nano-carbon materials used in the actuator according to the present invention is one part of a graphite structure. The graphene indicates an aggregate of carbon atoms, in which six-membered carbon rings having a planar structure are two-dimensionally arrayed, in other words, means a graphite structure formed from one carbon layer.

The amount of the conductive material to be added to the electrode of the actuator according to the present invention can be 1 wt % or more with respect to the weight of the electrode. When the amount of the conductive material to be added is 1 wt % or more with respect to the weight of the electrode, electrical conductivity necessary for functioning as the electrode can be imparted. When the content is less than 1 wt %, the electroconductivity of the electrode may not be sufficiently obtained.

The above described polymer constituting the electrode is not limited in particular as long as the polymer has the flexibility with which the polymer can deform while complying with the deformation of the above described actuator. It can desirably be little hydrolyzable and can be stable in the air. Such polymers can include: a polyolefin-based polymer such as polyethylene and polypropylene; polystyrene; polyimide; polyarylenes (aromatic polymer) such as polyparaphenylene oxide, poly(2,6-dimethylphenylene oxide) and polyparaphenylene sulfide; a compound in which a sulfonate group (—$SO_3H$), a carboxyl group (—COOH), a phosphate group, a sulfonium group, an ammonium group or a pyridinium group is introduced into a polyolefin-based polymer, polystyrene, polyimide or polyarylenes (aromatic-based polymer); a fluorine-containing polymer such as polytetrafluoroethylene and polyvinylidene fluoride; a perfluorosulfonate polymer, a perfluorocarboxylate polymer and a perfluorophosphate polymer in each of which a sulfonic group, a carboxyl group, a phosphate group, a sulfonium group, an ammonium group or a pyridinium group is introduced into a skeleton of the fluorine-containing polymer; a polybutadiene-based compound; a polyurethane-based compound such as an elastomer and a gel; a silicone-based compound; polyvinyl chloride; polyethylene terephthalate; nylon; and a polyarylate. These polymers may be used singly or in combinations of two or more. The polymers may also be functionalized, and may be reacted with other polymers to form a copolymer.

The polymers can be a fluororesin-based material, for instance, a polyvinylidene fluoride hexafluoropropylene copolymer (PVDF-HFP), polyvinylidene fluoride (PVDF) or the like, from the viewpoint of the chemical stability of a material. The polymer can also be a polymer which is highly compatible with the intermediate layer. When such a polymer is used, since compatibility and bondability with the intermediate layer can be enhanced, the polymer can constitute a tighter electrode. For this purpose, the polymer may be one of a polymer which has a polymer structure of the same type as, a similar type to or the same as the polymer structure of the cationically conductive polymer electrolyte that constitutes the intermediate layer, and a polymer which has a functional group of the same type as, a similar type to or the same as a functional group in the cationically conductive polymer electrolyte.

As described above, the electrode in the actuator according to the present invention contains the polymer and the above described conductive material which is dispersed in the polymer, and thereby the electroconductivity is imparted thereto. The electrical resistance value of the electrode is 1,000 Ω·cm or less, and can be 100 Ω·cm or less. The Young's modulus can be 0.1 to 600 MPa. When the Young's modulus is a value in this range, the flexibility and stretchability of the electrode is enhanced and the plastic deformation resistance is enhanced when applied to the actuator, and accordingly an ion conductive actuator having high repetition durability can be manufactured.

The electrode may also contain other components than the above described polymer and conductive material, for instance, a weakly acidic material according to the present invention, as long as the electrode does not give an unfavorable influence to the function of the actuator. The amount of the other components than the above described polymer and conductive material to be contained can be particularly 10 wt % or more and 60 wt % or less. As the ratio of the conductive material with respect to the amount of the polymer is higher, for instance, the electrode is preferable from the viewpoint of the electroconductivity, but when the amount of the polymer is less than 1 wt %, the electrode may lack self-standing properties and it becomes mechanically brittle. In addition, when the amount of the polymer exceeds 80 wt %, the above described conductive substance to be contained becomes relatively few. Accordingly, the electroconductivity sufficient for acting as the electrode may become insufficient, and the electrode may be difficult to be practically used from aspects of a response speed, deformation response characteristics and the like of the actuator.

The thickness of the electrode is not limited in particular as long as the electrode does not hinder the deformation of the above described actuator. The thickness can be 1 μm or more and 5 mm or less, can be 5 μm or more and 2 mm or less, and further can be 10 μm or more and 500 μm or less. When the thickness of each electrode is less than 1 µm, the electrode may cause a problem in electrical conductivity, which is not preferable as an electrode of the actuator. In addition, when the thickness of the electrode is larger than 5 mm, the electrode may become harder and brittle which is easily broken because of containing the conductive material. The thickness and the material of the electrodes in the negative electrode side and the positive electrode side are not necessary to be the same, which can be appropriately selected according to desired characteristics of the actuator.

(Intermediate Layer)

In the actuator according to the present invention, the intermediate layer is formed from at least a cationically conductive polymer electrolyte having an ether bond site and an anion site in the molecule, and a weakly acidic material which interacts with the ether bond site.

The cationically conductive polymer electrolyte can appropriately employ any conventionally known electrolyte as long as the electrolyte has the ether bond site in the molecule. Even if it does not have the there is no ether bond site in a precursor monomer stage, the electrolyte can be a copolymer thereof with a crosslinking unit having the ether bond site in the molecule; and there are no limitation as long as the electrolyte does not decrease the performance of the actuator. When the cationic species is an imidazolium cation in particular and carbons are used for the electrode, a performance of storing the cationic species in a negative electrode, accompanied with voltage application, is enhanced (mainly by interaction such as cation-$\pi$ and CH-$\pi$).

The intermediate layer of the cationically conductive polymer electrolyte may also contain an ionic liquid in an extent of not causing a leakage of the liquid. When the electrode also has an electrolyte, the cationic species of the cationically conductive polymer electrolyte can be the same as a cationic species of the electrolyte in the electrode, and then the actuator often shows an advantage of stabilizing deformation response characteristics of the actuator, particularly in deformation response characteristics in the early stage of driving, compared to the case in which the cationic species are different from each other.

The cationically conductive polymer electrolyte according to the present invention indicates a cationically conductive polymer electrolyte which does not contain an organic solvent. It is allowed, however, that a residual organic solvent originating from the manufacturing process is slightly contained. The cationically conductive polymer electrolyte also indicates a high-polymer material which contains a polyanion and which has a large number of ionizable groups. The charge of the polyanion is offset by the charge of an ion (cation) having the opposite charge to that of the polyanion so as to keep the electroneutrality in the polymer electrolyte, and this cationic species works as a carrier of the ion conduction. In addition, the cationic species can be particularly an organic cationic species. Organic cationic species has a large flexibility in designing various molecules and a large volume, and it facilitates obtaining a large degree of dissociation. The organic cationic species includes, for instance, but not particularly limited to, an imidazolium cation, a pyridinium cation, a quaternary ammonium cation and a quaternary phosphonium cation. Incidentally, when carbons as described above is employed as the electrode material, the imidazolium cation among them occasionally shows great interaction with the carbons.

An anion skeleton is not limited in particular. The anion skeleton can be at least one compound selected from derivatives of a trifluoromethane sulfonylimidate anion, derivatives of a cyanamide anion, an organic carboxylate anion, an organic phosphate anion and an organic sulfonate anion, from the viewpoint of the ease of synthesis.

The conductive polymer electrolyte according to the present invention has an ether bond. The number of these ether bonds can be 1 or more and 100 or less per repetition unit of the high polymer. When the conductive polymer electrolyte does not have an ether bond, the intermediate layer becomes rigid, and adequate deformation response characteristics suitable for an actuator may not be obtained. When the number is 100 or more, on the contrary, the intermediate layer is excessively soft, which may be hard to use as the intermediate layer.

Specific examples of the cationically conductive polymer electrolyte of an imidazolium cation type may be a copolymer of an acrylate, a vinyl sulfonate, a styrene sulfonate or a vinyl phosphate each of which has a cationic species of an imidazole compound such as 1,3-dimethylimidazole, 1,2,3-trimethyl imidazole, 1,3-dimethyl-2-ethylimidazole, 1-ethyl-3-methylimidazole, 1,2-dimethyl-3-ethylimidazole, 1,3-dimethyl-2-undecylimidazole, 1,3-diethylimidazole, 2-dimethyl-3-propylimidazole, 1,2,3-triethylimidazole, 1,3-diethyl-2-methylimidazole, 1,3-diethyl-2-undecylimidazole, 1-vinylimidazole, 1-vinyl-3-methylimidazole, 1-vinyl-3-ethylimidazole, 1-vinyl-2,3-dimethylimidazole, 4(5)-vinylimidazole and 1,3-dimethyl-4(5)-vinylimidazole, with a crosslinking agent having an ether bond site, for instance, such as ethylene glycol diacrylate, di(ethylene glycol)diacrylate, tetra(ethylene glycol)diacrylate, ethylene glycol dimethacrylate, di(ethylene glycol)dimethacrylate, triethylene glycol dimethacrylate, N,N'-methylenebisacrylamide and divinylbenzene; of course, may also be a compound such as a polymer electrolyte 19 having an ether bond in the molecule as illustrated in FIG. 1B; and furthermore, of course, may also be a compound such as a copolymer 20 thereof as illustrated in FIG. 2A.

In the above description, the imidazolium cation type was exemplified as one example of specific examples of the cationically conductive polymer electrolyte, but is not limited to those compounds in particular. Known cationically conductive polymer electrolytes suitable for the present invention can be appropriately used singly or in a complexed form thereof. In addition, the cationically conductive polymer electrolyte may also be used by complexing with other polymers. Any optimal cationically conductive polymer electrolyte can be appropriately used according to a desired performance of the actuator.

The weakly acidic material to be used for the present invention includes, for instance, a glass material and a silica material which necessarily contain a silanol group (maximum value of electrostatic potential: Si—OH 68), and a solid material such as magnesium oxide, beryllium oxide, iron oxide, aluminum oxide, titanium oxide, chromium oxide, cerium oxide and zirconium oxide, which have Lewis acidity. These substances can be used by being formed into a flake shape and a fiber shape, as well as a particle shape.

An organic material such as a polymer material or the like may also be complexed with the above described material, or may also be carried on the above described material, or may also modify the surface of the above described material.

The above polymer materials include, for instance: a fluorine-containing polymer such as tetrafluoroethylene and polyvinylidene fluoride; a polyolefin-based polymer such as polyethylene and polypropylene; a polybutadiene-based compound; a polyurethane-based compound such as an elastomer and a gel; a silicone-based compound; thermoplastic polystyrene; polyvinyl chloride; and polyethylene terephthalate. These polymer materials may be used singly or in combinations of two or more. The polymer material may also be reacted with other polymers to form a copolymer. These polymer materials can be used also by being formed into a film shape and a fiber shape, as well as a particle shape. In forming the polymer materials into the fiber shape, a spinning method such as an electrospinning method can be used.

The amount of the weakly acidic material contained in the intermediate layer can be 0.1 wt % or more and 80 wt % or less with respect to the whole amount of the intermediate layer, and can particularly be 0.1 wt % or more and 60 wt % or less. If the ratio of the weakly acidic material is small, the amount of the ion-conductive carrier in the intermediate layer inevitably increases, and thus the above described range is preferable from the viewpoint of the ionic conductivity. When the amount of the weakly acidic material is less than 0.1 wt %, the ratio at which the weakly acidic material interacts with the negative charge of oxygen atoms in the ether site is small, and an effect of enhancing cation conductivity often cannot be expected. On the other hand, when the amount of the weakly acidic material exceeds 80 wt %, the polymer electrolyte to be contained in the intermediate layer relatively decreases. Then, it may be becomes difficult to practically use the intermediate layer, from the aspect of deformation response characteristics and the like of the actuator, and the intermediate layer may lack self-standing properties and become mechanically brittle.

According to the present invention, the weakly acidic material can have a functional group on its surface, of which the maximum value of the electrostatic potential being 61 or more and 79 or less and can be 58 or more and 76 or less.

When lower acidity is seen for the weakly acidic material of which the maximum value of the electrostatic potential is less than 61, the interaction between the weakly acidic material and the negative charge of the oxygen atoms in the ether site is weak, and merely a lower effect is obtained for the above described suppression of the electrostatic interaction between the negative charge of the oxygen atoms in the ether site and the cationic species. When the functional group is alcohols, the maximum value of the electrostatic potential is, for instance, approximately 56 in MeOH, approximately 55 in EtOH, approximately 17.1 in iPrOH and approximately 53 in tBuOH.

On the other hand, when higher acidity is seen for the weakly acidic material of which the maximum value of the electrostatic potential is more than 79, a reaction such as the acid degradation of the polymer electrolyte may proceed. When the functional group is carboxylic acids, the maximum value of the electrostatic potential is approximately 81 in $MeCO_2H$ and approximately 84 in $HCO_2H$, for instance.

In other words, when the maximum value of the electrostatic potential is 61 or more and 79 or less, the negative charge of the oxygen atoms in the ether site adequately interacts with the weakly acidic material. Consequently, the weakly acidic material adequately suppresses the above described electrostatic interaction between the negative charge of the oxygen atoms in the ether site and the cationic species, and it prevents a reaction such as the acid degradation of the polymer electrolyte to proceed. As a result, by using the electrolyte containing the weakly acidic material for the intermediate layer of the actuator, an actuator which shows a larger deformation response and which shows better practicality is obtained.

The maximum value of the electrostatic potential can be calculated by conducting a molecular orbital calculation by Hartree-Fock, while using a molecular orbital calculation program Spartan '04 software for Windows (registered trademark) version 1.0.3. (Wavefunction, Inc., Irvine, Calif., U.S.A.), and 6-31G* as a basis function.

The maximum value of the electrostatic potential has a recognizable correlation with pKa. Specifically, when formic acid ($HCO_2H$), acetic acid ($MeCO_2H$), methanol (MeOH), ethanol (EtOH), isopropanol (iPrOH) and tertiarybutanol (tBuOH) are compared, the maximum values of the electrostatic potentials decrease in this order, (83.9403, 81.4716, 56.3698, 55.2072, 55.9751 and 53.3666, respectively), and these pKa values conversely increase (3.75, 4.75, 15.5, 16, 17.1 and 19, respectively).

The weakly acidic material may be an organic material, an inorganic material or a composite thereof as well. The inorganic material tends to be preferable, from the viewpoint of electric and chemical stability, and mechanical strength.

When the weakly acidic material is formed into a membrane shape which can pass the cationic species contained in the cationically conductive polymer electrolyte therethrough, an intermediate-layer membrane having more adequate mechanical strength can be manufactured. By using the weakly acidic material having been formed into the membrane shape, the intermediate-layer membrane having adequate mechanical strength can be manufactured. The generative force of the actuator is estimated by a product of the Young's modulus (Y) and distortion quantity ($\epsilon$) of the element. In other words, it is extremely effective to enhance the mechanical strength of the intermediate layer from the viewpoint of enhancing the generative force of the actuator, and by using such an intermediate layer, an actuator better in practicality is obtained. In addition, it is also expected to obtain an adequately self-standing membrane even though mechanical characteristics of the membrane are aggravated by introducing the ether bond skeleton into the structure of the polymer electrolyte. The distortion quantity ($\epsilon$) can be calculated through the following expression (1), from the value (displacement magnitude) of the deformation response characteristics which can be measured by using a laser displacement meter.

$$\epsilon = 2d\delta/(L^2+\delta^2) \tag{1}$$

Here, d is a thickness (mm) of the actuator, and $\delta$ is a value of half the maximum amount of displacement which has been measured with the use of a laser displacement meter. L is a distance from an actuator to a laser displacement meter, which is 8 mm in the present measurement.

Particularly, the membrane-shaped weakly acidic material which is a porous membrane or a fiber membrane is useful from the viewpoint of ion migration as well. The fiber membrane is a membrane formed of a plurality of fibers which are three-dimensionally entangled and cross each other to form the fiber membrane, and thereby a skeletal moiety for keeping the shape of the intermediate layer has porosity and the strength required of the actuator.

When the membrane-shaped weakly acidic material is the porous membrane or the fiber membrane, a porous structure of the membrane facilitates an easy migration of the cationic species, which passes through the voids by a potential difference applied between the electrodes on both ends. Hence, by using the electrolyte containing the membrane-shaped weakly acidic material for the intermediate layer of the actuator, an actuator which shows a larger deformation response and which shows better practicality is obtained.

The intermediate layer may also contain other components than the above described cationically conductive polymer electrolyte and the above described weakly acidic material, unless otherwise the intermediate layer gives unfavorable influence on the function of the actuator.

Fibrous materials of the fibrous-membrane-shaped weakly acidic material contained in the intermediate layer may be randomly oriented to each other to form a fiber membrane, the fibrous material may also have portions where the fibers are aligned in uniaxial direction in the membrane plane of the intermediate layer to form the membrane, and the fibrous material may also have a plurality of portions in each of which the fibers have different uniaxial directions to constitute the membrane. When the uniaxial directions are all the same, it can be expected to further enhance the deformation response characteristics (displacement) or the generative force of the actuator. For instance, from the viewpoint of enhancing the deformation response characteristics of the actuator, the fibrous materials can be arrayed so as to increase the mechanical strength in a direction perpendicular to the curvature direction of the actuator. In FIG. 1A, the direction of orienting the fibers in the fiber membrane can be a shorter direction of the actuator.

The thickness of the intermediate layer according to the present invention can be 10 μm or more and 500 μm or less, and further can be 10 μm or more and 400 μm or less. When the film thickness is more than 500 μm, the elastic modulus of the film increases, which may suppress the deformation movement of the actuator. When the film thickness is less than 10 μm, since the amount of the ionic substances is little, the amount to be supplied to the electrode decreases, and consequently a sufficient curvature movement may not be obtained.

Young's modulus of the intermediate layer according to the present invention can be 0.1 to 600 MPa. Since the Young's modulus of the polymer material is largely attributed to the molecular structure, the skeleton, the higher-order structure and the morphologic state, the numeric inevitably varies greatly according to the polymer materials to be used. When the Young's modulus is a value in this range, the flexibility in the intermediate layer is enhanced, and the plastic deformation resistance is enhanced when applied to the actuator, and accordingly an ion conductive actuator having higher repetition durability can be manufactured.

In the above description, the actuator according to the present invention has been described while taking the case in which the cross section perpendicular to the stacked direction is a rectangle as an example. However, various structures such as a circle, a triangle and an ellipse other than the rectangular flat shape can be selected as appropriate. The electrodes 13 and 14 may be the same shape or a different shape from each other. The actuator can have a structure formed of a single element or a composite structure formed of a plurality of elements.

Furthermore, the actuator of the present invention is not limited to a three-layer stacked structure of electrode/intermediate layer/electrode. Here, "/" denotes that the layers at both parts adjacently contact each other.

The actuator according to the present invention may also have a structure in which at least one part of the outside of the electrode is covered with a flexible insulation layer, or there is another electrode in the outside of the electrode, other than the above described structure, and the actuator can have any stacked structure based on a required performance as long as the structure is a structure of being curved and deformed while employing the above described three-layer stacked structure as a basic unit.

(Method for Manufacturing Actuator)

Any method can be applied for manufacturing the actuator according to the present invention. A preferable method includes: stacking an intermediate layer which has been manufactured, for instance, from a polymer electrolyte and a weakly acidic material, and a pair of electrodes; and heat-pressing (hot pressing or thermocompression bonding) the stacked body. Here, "heat-pressing" includes both methods of pressing the stacked body while heating the stacked body and raising the temperature while the stacked body is pressed.

The temperature, the pressing pressure and the period of time of the heat-pressing process are not limited in particular as long as the temperature does not exceed the degradation temperatures of the polymer of the polymer electrolyte and the weakly acidic material, which may be appropriately selected according to the used polymer, the high-polymer compound constituting the actuator, types of migrating ions and the like. For instance, the temperature of the heat-pressing process can be 30 to 150° C. The pressing pressure can be 10 to 1,000 Pa (1 to 100 kgf/cm$^2$), and can further be 100 to 500 Pa (10 to 50 kgf/cm$^2$).

The shape of the actuator according to the present invention is not limited to a strip shape, and any shape may also be adopted as appropriate.

(Driving the Actuator)

The drive principle working when the actuator according to the present invention is curved and deformed, in which an intermediate layer is arranged between a pair of electrodes, will be described below with reference to FIGS. 3A and 3B. In the actuator according to the present invention, cationic species 700 in a cationically conductive polymer electrolyte 800 is separated from the polyanion of the polymer electrolyte 800 by a voltage applied to the pair of the electrodes, and the cationic species 700 migrates to the negative electrode side. Thereby, the actuator is curved and deformed.

Figure 3A:
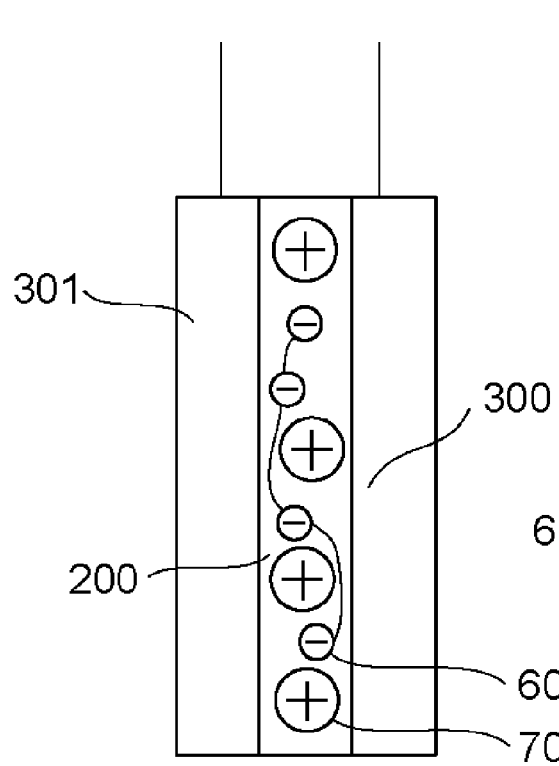
FIGS. 3A and 3B are schematic views illustrating the migration of ions in the actuator.
Figure 3B:
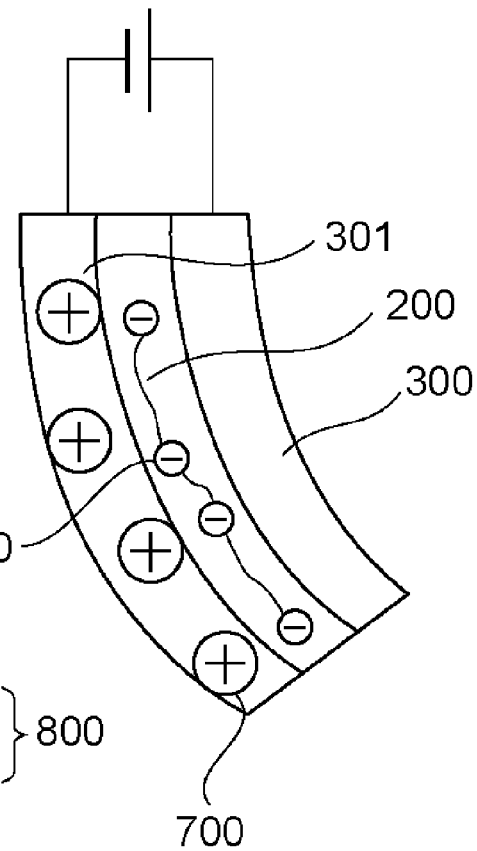

The pair of the electrodes 300 and 301 are formed on surfaces of the intermediate layer 200 in a state of being mutually insulated, as is illustrated in FIG. 3A. If a potential difference is applied between the pair of the electrodes 300 and 301, the cationic species in the electrolyte migrate and infiltrate into the negative electrode 301, as is illustrated in FIG. 3B. Then, an electric double layer is formed in the interface between the conductive material in the electrode 301 and an ionic-substance phase. It is considered that, consequently, the electrode layer 301 is expanded by a cooperative action of a steric effect of the cationic species existing in the electrode and an electrostatic repulsion caused by the formation of the electric double layer, and that the actuator curves in a direction in which the electrode in the cathode side is elongated compared to the electrode in the anode side. Usually, when the polarity of the potential is reversed, the film is curved and deformed in the reverse direction. The direction of the displacement changes according to the structures of the electrode and the intermediate layer.

The voltage to be applied to the actuator according to the present invention can be appropriately determined in consideration of the withstand voltage of the actuator element material and the withstand voltage of the electrolyte.

EXAMPLE

Examples according to the present invention will be described below. It should be noted, however, that the present invention is not limited to these Examples.

(Evaluation for Performance of Actuator)

Prepared actuators had a strip shape with a width of 1 mm, a length of 12 mm and a predetermined film thickness, hold a portion of the actuator in a length of 2 mm from an end with a holder (terminal) as a fixing tool provided with a platinum electrode, and voltage is applied to the portion in the air. As for the deformation response characteristics of the actuator, a displacement magnitude was evaluated at a predetermined position. As for the deformation response characteristics (amount of displacement), the displacement caused by a drive voltage of ±1.0 V and a drive frequency of 1 Hz was measured at a position (measurement point of actuator) of 9 mm apart from the fixed end, with the use of a laser displacement meter.

Example 1

In Example 1, an actuator having a three-layer structure in which a pair of electrodes and an intermediate layer are stacked, as illustrated in FIG. 1A, was prepared.

The electrode was prepared in the following procedure.

Into a container, 50 mg of a single layer carbon nanotube (SWNT made by Unidym, Inc., "HiPco" (trade name)) which is a conductive material, 110 mg of a cationically conductive polymer electrolyte 19, and 1 mL of 1-methyl-2-pyrrolidinone (NMP made by Kishida Chemical Co., Ltd.) which is an organic solvent were charged. Zirconia balls with a particle diameter of 2 mm were added up to the ⅓ height of the container volume, and the mixture was subjected to dispersion treatment on a condition of 200 rpm for 30 minutes with the use of a ball mill machine (planet-type particle grinder made by Fritsch GmbH). Subsequently, a solution, prepared by dissolving 22 mg of PVdF-HFP (KYNAR made by Arkema Inc.) in DMAc (1 mL) by heating, was added to the dispersed solution. The mixture solution was further subjected to dispersion treatment on a condition of 500 rpm for 60 minutes.

An electrode having uniform thickness, in which the conductive material were uniformly dispersed, was obtained by pouring the obtained mixture solution into a mold made from PTFE, uniformly flattening the poured solution with a blade or the like, and then drying the flattened solution at room temperature in a vacuum. The electroconductivity determined with the four-terminal method was 44 S/cm.

The structural formula of the cationically conductive polymer electrolyte 19 is shown below.

[Formula 1]

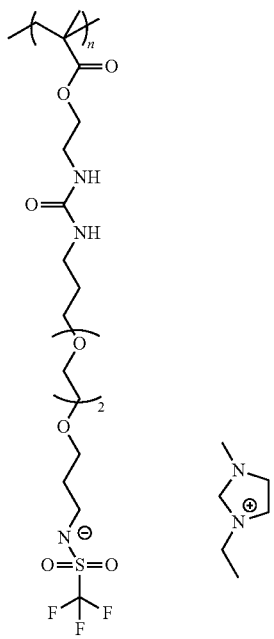

The intermediate layer was prepared in the following procedure.

A cationically conductive polymer electrolyte 20 was mixed with silica ($SiO_2$) particles (particle diameter of 1 μm, made by Sigma-Aldrich Corporation) which is a weakly acidic material so that the weight ratio became 9:1, and the mixture and 1 mL of NMP were charged into the container. Zirconia balls having a particle diameter of 2 mm were added up to the ⅓ height of the container volume, and the mixture was subjected to dispersion treatment with the use of the ball mill machine on a condition of 500 rpm for 30 minutes. The intermediate layer having uniform thickness, in which the weakly acidic material was uniformly dispersed, was obtained by pouring the obtained mixture liquid into a mold made from PTFE, uniformly flattening the poured liquid by a blade or the like, and then drying the flattened liquid at room temperature in a vacuum.

The structural formula of the cationically conductive polymer electrolyte 20 is shown below.

[Formula 2]

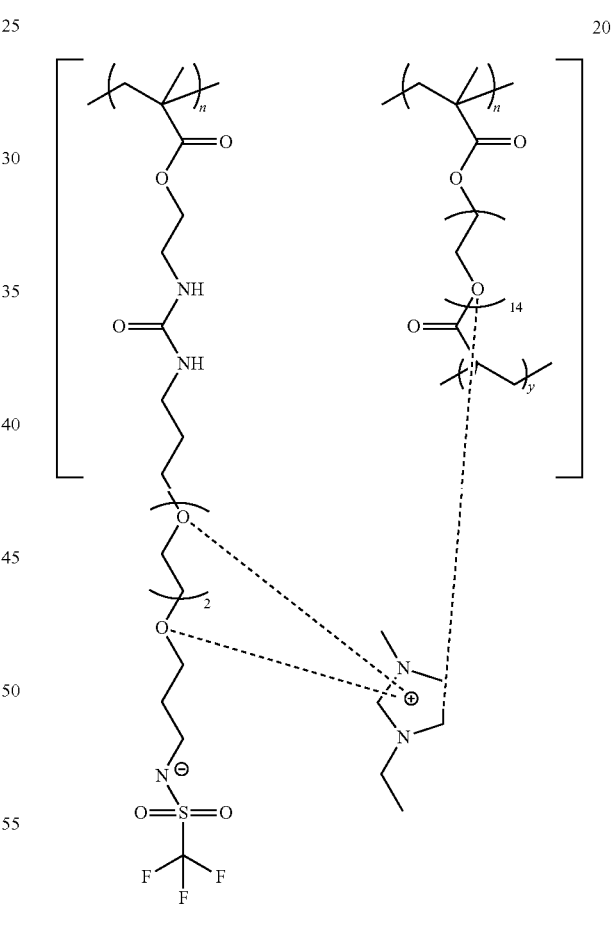

A representative stacked body was obtained by cutting the electrode obtained in the above into a width of 1 mm and a length of 12 mm, cutting the intermediate layer obtained in the above into a width of 2 mm and a length of mm, and hot-pressing and compression-bonding the cut electrode and intermediate layer in a state of having the electrodes arranged in both sides of the intermediate layer, on conditions of room temperature, 0.5 kN (Newton) and 1 minute. The obtained stacked body was dried in a vacuum for approximately 12 hours. Finally, the actuator was obtained by trimming a portion at which the intermediate layer protruded. The obtained actuator had a width of 1 mm, a length of 12 mm and a thickness of approximately 210 μm (in which the thickness of the intermediate layer was approximately 50 μm and the thickness of the both electrodes were approximately 80 μm).

The width and the length of the actuator were set at the same value also in the following Examples and Comparative Examples.

(Synthesis of Cationically Conductive Polymer Electrolytes 19 and 20)

Firstly, trifluoromethane sulfonic acid anhydride (made by KANTO-CHEMICAL-CO., INC., 4.33 mmol), 4,7,10-trioxa-1,13-tridecanediamine (made by Sigma-Aldrich Corporation, 9.09 mmol) were cooled with ice in dehydrated chloroform (made by KANTO CHEMICAL CO., INC., 40 mL) and were stirred for 30 minutes, and the obtained mixture liquid was returned to room temperature and was further stirred for 20 hours. After that, N-(3-{2-[2-(3-aminopropoxy)-ethoxy]-ethoxy}-propyl)-C,C,C-trifluoromethane sulfonic acid amide (compound 16) which was an oily compound was obtained at a yield of 94%, by removing the solvent with an evaporator, and further repeating the cleaning and drying of the compound with diethyl ether (made by Kishida Chemical Co., Ltd., 50 mL), 3 times.

Next, the compound 16 (8.77 mmol) and 2-isocyanate ethyl ester (meth)acrylate (made by Sigma-Aldrich Corporation, 11.83 mmol) were stirred in the dehydrated chloroform (made by KANTO CHEMICAL CO., INC., 40 mL) in the presence of a small amount of hydroquinone (made by Sigma-Aldrich Corporation) at 0° C. for 30 minutes, and then the obtained mixture liquid was returned to room temperature and was further stirred for 24 hours. After that, the solvent was removed with an evaporator, and further cleaning and drying of the compound was repeated with diethyl ether (made by Kishida Chemical Co., Ltd., 50 mL) for 3 times, and then 2-methylacrylic acid 2-[1-(3-{2-[2-(3-trifluoromethane sulfonylaminopropoxy)-ethoxy]-ethoxy}-propylamino)-vinylamino]-ethyl ester (compound 17) which was an oily compound, was obtained at a yield of 93%.

Next, the compound 17 (6.9 mmol) and LiH (made by Sigma-Aldrich Corporation, 10.3 mmol) were stirred in dehydrated tetrahydrofuran (made by KANTO CHEMICAL CO., INC., 30 mL) in the presence of a small amount of hydroquinone at 0° C. for 30 minutes. Subsequently, ethylmethyl imidazolium bromide (made by TOKYO CHEMICAL INDUSTRY CO., LTD., 7.59 mmol) was added to the stirred solution, and the resultant solution was warmed to room temperature and was further stirred for 24 hours. After that, filtering the solution, removing the solvent with an evaporator, and drying the residue in a vacuum was sequentially conducted, and then a monomer 18 which was an oily compound was obtained at a yield of 94%.

The structural formula of the monomer 18 is shown below.

[Formula 3]

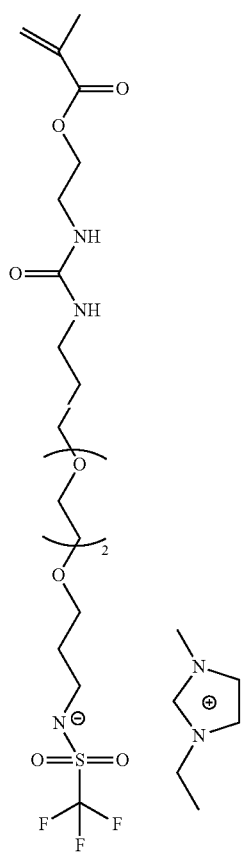

18

(Compound 16)
$^1$H NMR: δ 5.76 (2H, s, NH$_2$), 5.76 (2H, s, NH$_2$), 3.65-3.55 (12H, m, OCH$_2$), 3.30 (1H, t, J=6.0 Hz, CH$_2$N), 2.96 (3H, t, J=6.0 Hz, CH$_2$N), 1.81 (4H, qt, J=6.6 Hz, CH$_2$); $^{13}$C NMR: 120.0 (q, J=319 Hz, CF$_3$), 70.0, 69.9, 69.6, 69.5, 69.3, 69.1, 69.0, 68.2 (CH$_2$O), 42.2, 38.9 (CH$_2$N), 30.7, 28.1 (CH$_2$CH$_2$N); $^{19}$F NMR: δ−78.0, −79.0 (3F, s, CF$_3$).

(Compound 17)
$^1$H NMR: δ 7.41 (1H, br s, NH), 6.01 (1H, s, CH$_2$=C), 5.77 (2H, m, CONH), 5.46 (1H, s, CH$_2$=C), 4.03 (2H, t, 5.5 Hz, CH$_2$O), 3.70-3.35 (12H, m, OCH$_2$), 3.32 (2H, m, CH$_2$NH), 3.07 (4H, m, CH$_2$NH, CH$_2$NS), 1.87 (2H, m, CH$_2$CH$_2$NS), 1.81 (3H, s, CH$_3$), 1.58 (2H, m, CH$_2$); $^{13}$C NMR: 167.2 (CO), 159.1, 158.8 (CONH), 135.7 (C=), 125.7 (=CH$_2$), 120.0 (q, J=318 Hz, CF$_3$), 70.2, 69.9, 69.8, 69.4, 69.2, 69.0, 68.6, 67.9 (CH$_2$O), 63.8, 63.7 (CH$_2$OCO), 44.7 (CH$_2$), 40.4, 39.7 (CH$_2$NS), 38.6 (CH$_2$NH), 37.3, 36.7 (CHAT), 30.0, 29.4 (NHCH$_2$CH$_2$), 26.0, 25.7 (CH$_2$CH$_2$NS), 17.9 (CH$_3$), $^{19}$F NMR: δ−79.4 (3F, s, CF$_3$).

(Compound 18)
$^1$H NMR: δ9.41 (1H, s, CH), 7.42 (2H, m, CH=CH), 6.32 (2H, m, CONH), 6.01 (1H, s, CH$_2$=C), 5.46 (1H, t, J=1.5 Hz, CH$_2$=C), 4.18 (2H, q, J=7.3 Hz, CH$_2$), 3.98 (2H, t, 5.7 Hz, CH$_2$O), 3.87 (3H, s, NCH$_3$), 3.65-3.15 (14H, m, NHCH$_2$, OCH$_2$), 3.08 (3H, m, CH$_2$N), 2.78 (1H, t, J=5.2 Hz, CH$_2$NS), 1.76 (3H, s, CH$_2$CH$_3$), 1.68 (2H, m, CH$_2$), 1.52 (2H, m, CH$_2$), 1.41 (3H, t, J=7.3 Hz, CH$_3$); $^{13}$C NMR: 167.0 (CO), 159.5, 159.3 (CONH), 135.9 (CH), 135.5 (C=), 125.7 (=CH$_2$), 123.4 (CH═CH), 121.7 (CH═CH), 119.6 (q, J=321 Hz, CF$_3$), 70.7, 69.1, 68.9, 68.5, 68.4, 67.5, 67.0 (CH$_2$O), 63.5 (CH$_2$OCO), 44.7 (CH$_2$), 40.0, 39.2 (CH$_2$N), 38.4 (CH$_2$NH), 36.0 (NCH$_3$), 35.6, 34.9 (CH$_2$NS), 30.2, 29.4, 29.3, 25.1 (CH$_2$CH$_2$N), 17.9 (CH$_3$), 15.0 (CH$_2$CH$_3$); $^{19}$F NMR: δ–79.2 (3F, s, CF$_3$)

(Preparation of Cationically Conductive Polymer Electrolyte 19)

A cationically conductive polymer electrolyte 19 was obtained by polymerizing a vinyl monomer 18.

Azoisobutyronitrile (AIBN made by Wako Pure Chemical Industries, Ltd. 5 wt %) which is a radical initiator was added to a predetermined amount of the vinyl monomer 18. A representative cationically conductive polymer electrolyte 19 was obtained by heating and stirring the mixture in the absence of a solvent or in dehydrated ethanol (made by Wako Pure Chemical Industries, Ltd., 5 cc) which was bubbled with argon, under argon atmosphere at 50° C. for 20 hours, and subsequently heating the product at 80° C. for 2 hours.

[Preparation of Copolymer 20 (Cationically Conductive Polymer Electrolyte 20)]

A representative copolymer 20 was obtained by: mixing a vinyl monomer 22 and polyethylene glycol 600 dimethacrylate (registered trademark by Shin Nakamura Chemical Co., Ltd.) (having a structure of repeating 14 units of ethylene oxide of ethylene glycol methacrylate) with the monomer 18 so that the weight ratio became 2:8; adding 2 mol % of AIBN to the mixture in the absence of a solvent or in dehydrated ethanol (made by Pure Chemical Industries, Ltd., 5 cc) which was bubbled with argon; heating and stirring the mixture under argon atmosphere at 50° C. for 20 hours; and subsequently heating the product at 80° C. for 2 hours. The polymer electrolyte 19 and the copolymer 20 were not dissolved in chloroform which is a good solvent of a precursor monomer.

The structural formula of the vinyl monomer 22 is shown below.

[Formula 4]

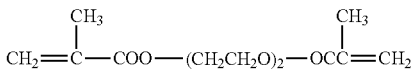

n = 14

Example 2

Example 2 is related to an actuator in which the intermediate layer is different from that in Example 1. The representative actuator was prepared in a similar way to that in Example 1, except that the intermediate layer was prepared in the following way.

Firstly, the intermediate layer which contained a weakly acidic material and had a uniform thickness was obtained by applying an ethanol solution containing the cationically conductive polymer electrolyte 20 onto a glass fiber membrane (randomly oriented fiber membrane made by Nippon Sheet Glass Co., Ltd., basis weight of 17 g/m$^2$), (in which the weight ratio of the electrolyte:the glass fiber membrane was adjusted to 9:1), uniformly flattening the applied solution with a blade or the like, and drying the flattened solution at room temperature in a vacuum for 24 hours.

The thickness of the obtained actuator according to the present Example 2 was approximately 210 μm (in which the thickness of the intermediate layer was approximately 50 μm, and the thickness of the both electrodes were approximately 80 μm).

Comparative Example 1

In Comparative Example 1, An actuator was prepared in a similar way to that in Example 2, except that the intermediate layer did not contain a weakly acidic material. The intermediate layer did not contain the glass fiber in Example 2.

The thickness of the obtained actuator was approximately 210 μm, the thickness of the intermediate layer was approximately 50 μm, and the thicknesses of the two electrodes were both approximately 80 μm.

Comparative Example 2

In Comparative Example 2, a representative actuator was prepared in a similar way to that in Example 2, except that a glass fiber membrane contained in the intermediate layer in Example 2 was replaced by a cellulose fiber membrane (made by NIPPON KODOSHI CORPORATION, randomly oriented fiber membrane, maximum value of electrostatic potential, basis weight of 15.8 g/m$^2$).

The thickness of the obtained actuator was about 210 μm, the thickness of the intermediate layer was about 50 μm, and the thickness of two electrodes was both about 80 μm.

(Evaluation for Performance of Actuator)

The following table 1 shows the result of deformation response characteristics (relative value of displacement magnitude: denoted as relative ratio with reference to value of amount of displacement of Comparative Example 1) of the actuator in Example and Comparative Example.

TABLE 1

| | Relative value of displacement magnitude (relative value with reference to value of amount of displacement of Comparative Example 1) |
|---|---|
| Example 1 | 1.77 |
| Example 2 | 2.14 |
| Comparative Example 1 | 1.00 |
| Comparative Example 2 | 1.02 |

Figure 4A:
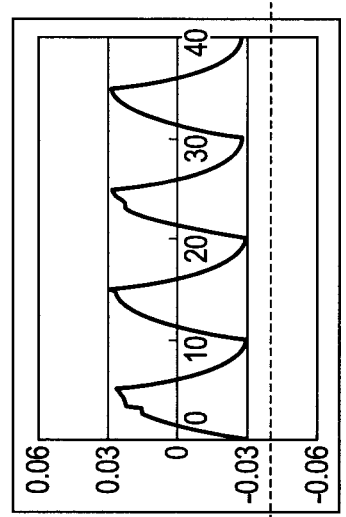
FIG. 4A is a view illustrating a result of the displacement response measurement of the actuator in Example 1 according to the present invention.
Figure 4B:
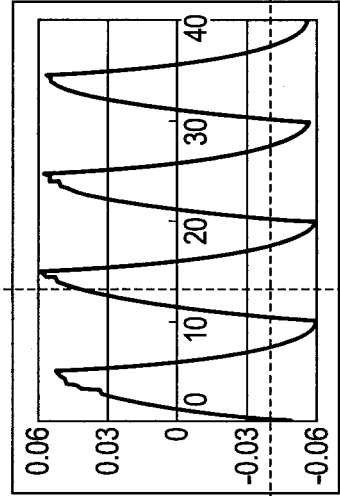
FIG. 4B is a view illustrating a result of the displacement response measurement of the actuator in Example 2 according to the present invention.
Figure 4C:
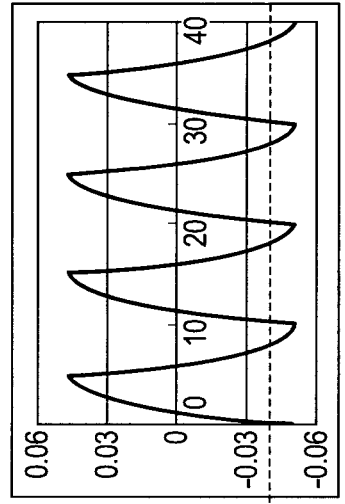
FIG. 4C is a view illustrating a result of the displacement response measurement of the actuator in Comparative Example.

When Example 1 and Example 2 in which the intermediate layer was formed from a cationic electrolyte containing the above described weakly acidic material is compared with Comparative Example 1 in which the intermediate layer was formed only from an cationic electrolyte, it is seen that the deformation response characteristics are enhanced in the actuators which have the intermediate layer formed from the cationic electrolyte containing the weakly acidic material. FIG. 4A shows the result of the measurement of the deformation response characteristics (measurement of displacement magnitude) in Example 1, FIG. 4B shows that in Example 2, and FIG. 4C shows that in Comparative Example 1.

The actuator in Comparative Example 2, in which the intermediate layer contains the cellulose fiber membrane (having alcoholic hydroxyl group (R—OH) on its surface), has the same value of the deformation response characteristics (amount of displacement) as in Comparative Example 1, and consequently it is seen that an effect of enhancing the deformation response characteristics of the actuator is not adequate even though the intermediate layer contains a solid material having a functional group of which the maximum value of the electrostatic potential is less than 61.

In addition, when an actuator is prepared by using a Flemion membrane (made by ASAHI GLASS CO., LTD., and having carboxyl group ($R-CO_2H$) on its surface) in place of a cellulose membrane in Comparative Example 2, a reaction such as acid degradation proceeded in a methacrylate ester moiety in a polymer electrolyte 20 was observed from an infrared absorption spectrum. Consequently, it is seen that the intermediate layer which contains the solid material having a functional group of which the maximum value of the electrostatic potential is larger than 79 is not preferable from the viewpoint of practicality.

On the other hand, the maximum value of an electrostatic potential of a silanol group which necessarily exists on a surface of a silica ($SiO_2$) particle in Example 1 and a surface of the glass fiber in Example 2 is about 69. From the fact, it is seen that the deformation response characteristics are enhanced when the intermediate layer contains a weakly acidic material having a functional group of which the maximum value of the electrostatic potential is 61 or more and 79 or less, on its surface. For information, the silanol existing on the surface of the silica particle and the glass fiber was confirmed from the infrared absorption spectrum.

Then, when Example 1 and Example 2 are compared with each other, Young's modulus (measured by using tension tester (made by Shimadzu Corporation)) of the intermediate layers were 1.5 Mpa and 1.9 Mpa, respectively. When the weakly acidic material was formed into a membrane shape, the intermediate layer had adequate mechanical characteristics and the mechanical strength increased to 1.3 times. From the result, it is seen that the membrane having more adequate mechanical strength can be obtained by using the weakly acidic material which is formed into the membrane shape.

The actuator according to the present invention has a large deformation response, which is excellent in practicality, and which can be used as an alternative for a conventional type actuator such as an electro-magnetic motor and electric motor, and an oil pressure and air pressure cylinder, which have been used conventionally.

The present invention is not limited to the above embodiments and various changes and modifications can be made within the spirit and scope of the present invention. Therefore to apprise the public of the scope of the present invention, the following claims are made.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-285743, filed Dec. 22, 2010, which is hereby incorporated by reference herein in its entirety.

What is claimed is:

1. An actuator having a pair of opposing electrodes and an intermediate layer arranged between the pair of the electrodes, the actuator being curved and displaced when voltage is applied to the electrodes,
   wherein the intermediate layer has at least:
      a cationically conductive polymer electrolyte having an ether bond site and an anion site in its molecule; and
      a weakly acidic material, which interacts with the ether bond site and which is different from the cationically conductive polymer electrolyte.

2. The actuator according to claim 1, wherein the cationically conductive polymer electrolyte contains a cationic species.

3. The actuator according to claim 2, wherein the cationic species is at least one selected from the group consisting of an imidazolium cation, a pyridinium cation, a quaternary ammonium cation, and a quaternary phosphonium cation.

4. The actuator according to claim 1, wherein the weakly acidic material has a functional group of which a maximum value of an electrostatic potential is 61 or more and 79 or less, on its surface.

5. The actuator according to claim 1, wherein the weakly acidic material is formed into a membrane shape which can pass the cationic species contained in the cationically conductive polymer electrolyte therethrough.

6. The actuator according to claim 5, wherein the weakly acidic material is a porous membrane or a fiber membrane.

7. The actuator according to claim 1, wherein the weakly acidic material is at least one selected from the group consisting of a glass material, a silica material, magnesium oxide, beryllium oxide, iron oxide, aluminum oxide, titanium oxide, chromium oxide, cerium oxide, and zirconium oxide.

* * * * *